US012592068B2

(12) United States Patent
Amada et al.

(10) Patent No.: US 12,592,068 B2
(45) Date of Patent: Mar. 31, 2026

(54) ADVERSARIAL EXAMPLE DETECTION DEVICE, ADVERSARIAL EXAMPLE DETECTION METHOD, AND PROGRAM

(71) Applicant: NEC Corporation, Tokyo (JP)

(72) Inventors: Takuma Amada, Tokyo (JP); Kazuya Kakizaki, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 674 days.

(21) Appl. No.: 18/007,521

(22) PCT Filed: Jun. 5, 2020

(86) PCT No.: PCT/JP2020/022424
§ 371 (c)(1),
(2) Date: Dec. 1, 2022

(87) PCT Pub. No.: WO2021/245945
PCT Pub. Date: Dec. 9, 2021

(65) Prior Publication Data
US 2023/0222782 A1      Jul. 13, 2023

(51) Int. Cl.
*G06V 10/82*      (2022.01)

(52) U.S. Cl.
CPC .................................... *G06V 10/82* (2022.01)

(58) Field of Classification Search
CPC .... G06V 10/82; G06V 10/761; G06V 10/764; G06V 40/172; G06N 20/00
USPC .......... 706/12, 21, 25, 15, 26; 707/688, 737, 707/769, 770, 802
See application file for complete search history.

(56) References Cited

U.S. PATENT DOCUMENTS

| | | | | |
|---|---|---|---|---|
| 10,936,973 B1 * | 3/2021 | Wang | ........................ | G06N 7/01 |
| 2020/0143045 A1 * | 5/2020 | Joye | ........................ | G06F 21/75 |
| 2020/0410335 A1 * | 12/2020 | Gu | ........................ | G06V 10/776 |
| 2021/0056404 A1 * | 2/2021 | Goswami | ................ | G06F 18/22 |
| 2021/0157912 A1 * | 5/2021 | Kruthiveti Subrahmanyeswara Sai | .............. | G06F 21/554 |

FOREIGN PATENT DOCUMENTS

| | | |
|---|---|---|
| JP | 2008-059408 A | 3/2008 |
| JP | 2019-046390 A | 3/2019 |

OTHER PUBLICATIONS

International Search Report for PCT Application No. PCT/JP2020/022424, mailed on Sep. 8, 2020.

(Continued)

*Primary Examiner* — Md I Uddin
(74) *Attorney, Agent, or Firm* — Sughrue.Mion, P.LLC

(57) ABSTRACT

An adversarial example detection device includes a first feature extraction unit configured to extract first features with respect to input data and comparative data in a first calculation method, a second feature extraction unit configured to extract second features with respect to the input data and the comparative data in a second calculation method different from the first calculation method, and a determination unit configured to determine whether or not at least one piece of the input data and the comparative data is an adversarial example through calculation using the first features and the second features.

8 Claims, 9 Drawing Sheets

(56) References Cited

OTHER PUBLICATIONS

Weilin Xu et al., "Feature Squeezing: Detecting Adversarial Examples in Deep Neural Networks", Proceedings of the in Network and Distributed Systems Security Symposium (NDSS), 2018.
Guanhong Tao et al., "Attacks Meet Interpretability: Attribute-steered Detection of Adversarial Samples", Proceedings of Advances in Neural Information Processing Systems (NIPS), 2018.
A. Higashi et al., "Detecting Adversarial Example Based on Changes of CNN Classification Results caused by JPEG compression", Proceedings of the computer security symposium, 2019.

* cited by examiner

FIG. 7

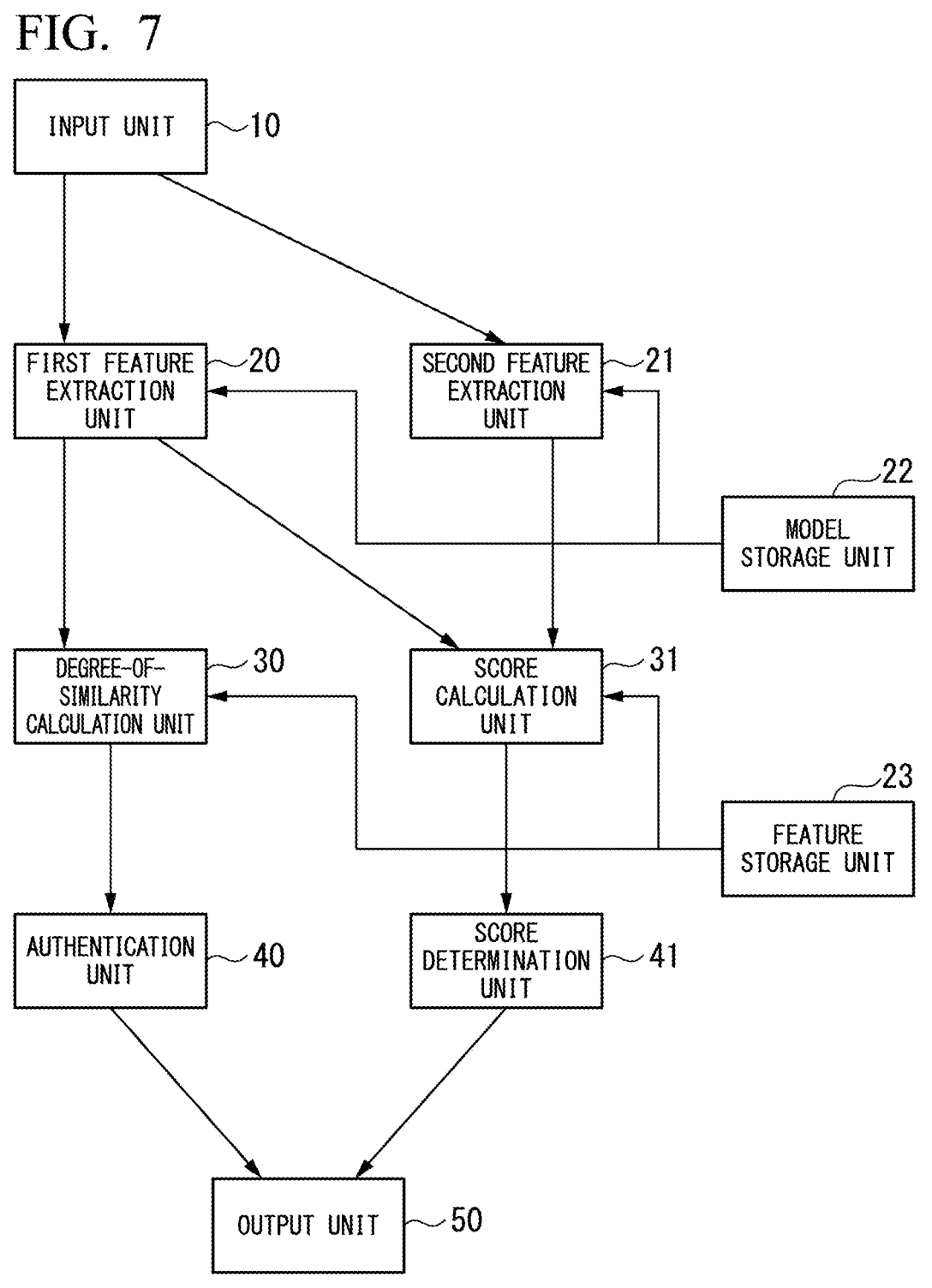

```
                    ┌──────────────┐
                    │  INPUT UNIT  │──10
                    └──────────────┘
                      │          ╲
                      ▼           ╲
         ┌──────────────┐      ┌──────────────┐
         │ FIRST FEATURE│──20  │SECOND FEATURE│──21
         │  EXTRACTION  │◄──   │  EXTRACTION  │
         │     UNIT     │      │     UNIT     │
         └──────────────┘      └──────────────┘
                                                    ┌──────────────┐
                                                    │    MODEL     │──22
                                                    │ STORAGE UNIT │
                                                    └──────────────┘
         ┌──────────────┐      ┌──────────────┐
         │  DEGREE-OF-  │──30  │    SCORE     │──31
         │  SIMILARITY  │◄──   │ CALCULATION  │◄──
         │CALCULATION UNIT│    │     UNIT     │
         └──────────────┘      └──────────────┘
                                                    ┌──────────────┐
                                                    │   FEATURE    │──23
                                                    │ STORAGE UNIT │
                                                    └──────────────┘
         ┌──────────────┐      ┌──────────────┐
         │AUTHENTICATION│──40  │    SCORE     │──41
         │     UNIT     │      │DETERMINATION │
         │              │      │     UNIT     │
         └──────────────┘      └──────────────┘
                      ╲          ╱
                       ▼        ▼
                    ┌──────────────┐
                    │ OUTPUT UNIT  │──50
                    └──────────────┘
```

ADVERSARIAL EXAMPLE DETECTION DEVICE, ADVERSARIAL EXAMPLE DETECTION METHOD, AND PROGRAM

This application is a National Stage Entry of PCT/JP2020/022424 filed on Jun. 5, 2020, the contents of all of which are incorporated herein by reference, in their entirety.

TECHNICAL FIELD

The present invention relates to an adversarial example detection device, an adversarial example detection method, and a program.

BACKGROUND ART

There is technology for performing image recognition using machine learning. In order to perform image recognition more accurately, it is necessary to detect an input called adversarial examples that are created such that a machine-trained model is misrecognized Non-Patent Literature 1 and 2 discloses technologies for detecting an adversarial example by performing a different process for one piece of input data and performing the comparison of data generated as results of performing the process in a classifier that classifies one piece of input data as one of a plurality of preset classes.

Also, Patent Literature 1 discloses technology for automatically generating learning data necessary for machine learning and improving learning accuracy using a generative adversarial network.

PRIOR ART DOCUMENTS

Patent Documents

Patent Document 1: Japanese Unexamined Patent Application, First Publication No. 2019-046390

Non-Patent Documents

Non-Patent Document 1

Weilin Xu et al., "Feature Squeezing: Detecting Adversarial Examples in Deep Neural Networks", Proceedings of the Network and Distributed Systems Security. Symposium (NDSS) 2018.

Non-Patent Document 2

Guanhong Tao et al., "Attacks Meet Interpretability: Attribute-steered Detection of Adversarial Samples", Proceedings of Advances in Neural Information Processing Systems (NIPS), 2018.

SUMMARY OF THE INVENTION

Problems to be Solved by the Invention

Meanwhile, as a method of performing authentication for a person or the like, a technique of authenticating a person by calculating a degree of similarity between features of input data and comparative data is also known in addition to a technique of authenticating a person by classifying input data as one of a plurality of preset classes representing a plurality of persons.

However, technologies described in Non-Patent Literature 1 and 2 are technologies for detecting an adversarial example (sample) in a classifier that classifies one piece of data as one of a plurality of classes and technology for detecting an adversarial example in an authenticator that compares features of two or more pieces of data is not disclosed. Also, in the technology described in Patent Literature 1, a process of detecting an adversarial example is not taken into consideration.

An example object of the present invention is to provide an adversarial example detection device, an adversarial example detection method, and a program for solving the above problems.

Means for Solving the Problems

According to a first example aspect of the present invention, there is provided an adversarial example detection device including: a first feature extraction means configured to extract first features with respect to input data and comparative data in a first calculation method; a second feature extraction means configured to extract second features with respect to the input data and the comparative data in a second calculation method different from the first calculation method; and a determination means configured to determine whether or not at least one piece of the input data and the comparative data is an adversarial example through calculation using the first features and the second features.

According to a second example aspect of the present invention, there is provided an adversarial example detection method including: extracting first features with respect to input data and comparative data in a first calculation method; extracting second features with respect to the input data and the comparative data in a second calculation method different from the first calculation method; and determining whether or not at least one piece of the input data and the comparative data is an adversarial example through calculation using the first features and the second features.

According to a third example aspect of the present invention, there is provided a program for allowing a computer to function as: a first feature extraction unit configured to calculate first features with respect to one or more pieces of input data and one or more pieces of comparative data in a first calculation method; a second feature extraction unit configured to calculate second features with respect to the input data and the comparative data in a second calculation method, the second calculation method being different from the first calculation method; and a determination unit configured to determine whether or not at least one piece of the input data and the comparative data is an adversarial example through calculation using the first features and the second features.

Effects of the Invention

According to at least one of the example aspects described above, an adversarial example can be detected in an authenticator that compares features of two or more pieces of data.

BRIEF DESCRIPTION OF DRAWINGS

FIG. 7 is a schematic block diagram showing a configuration of an authentication device according to a third example embodiment.

EXAMPLE EMBODIMENT

Hereinafter, embodiments of the present invention will be described in detail with reference to the drawings.

First Example Embodiment

Figure 1:
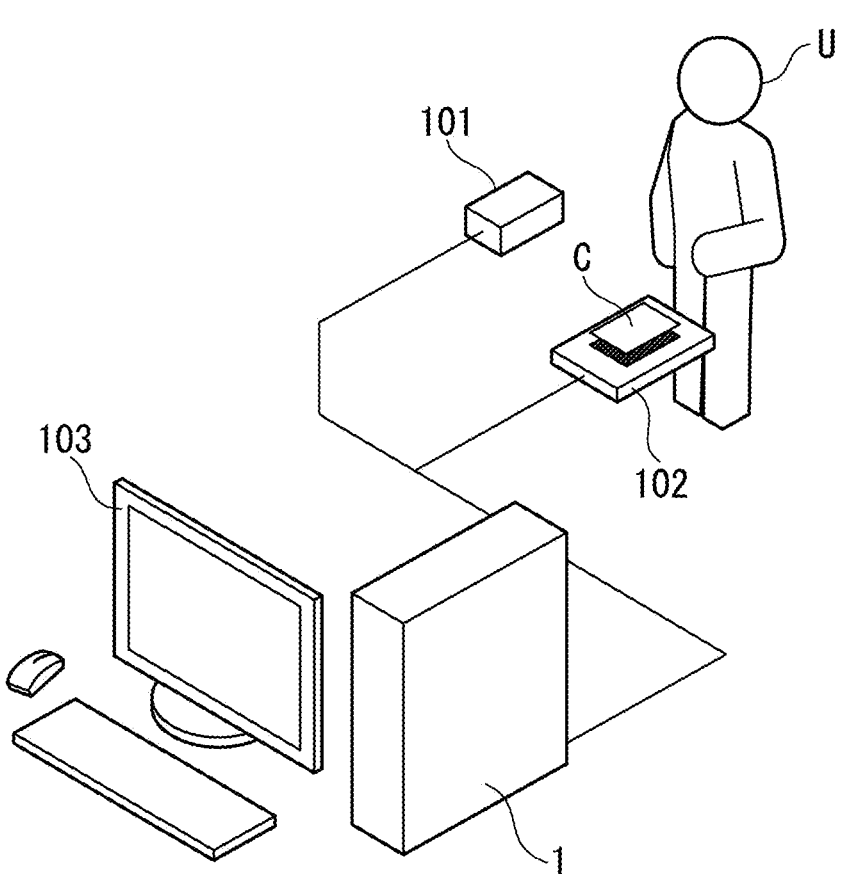
FIG. 1 is a configuration diagram of an authentication device according to a first example embodiment.

FIG. 1 is a configuration diagram of an authentication device according to a first example embodiment.

An authentication device 1 acquires image data from a photograph or a certificate possessed by a user U from a reading device 102. Subsequently, other image data is acquired by imaging the user U with a camera 101. Subsequently, two pieces of image data are compared and the authentication device 1 authenticates whether or not the image data corresponds to the same person. Subsequently, the authentication device 1 outputs a result to the display 103 and allows the display 103 to display the result. Also, the image data may be an adversarial example that induces an erroneous determination process of the authentication device. The authentication device according to the first example embodiment has a function of determining whether or not input image data is an adversarial example.

Figure 2:
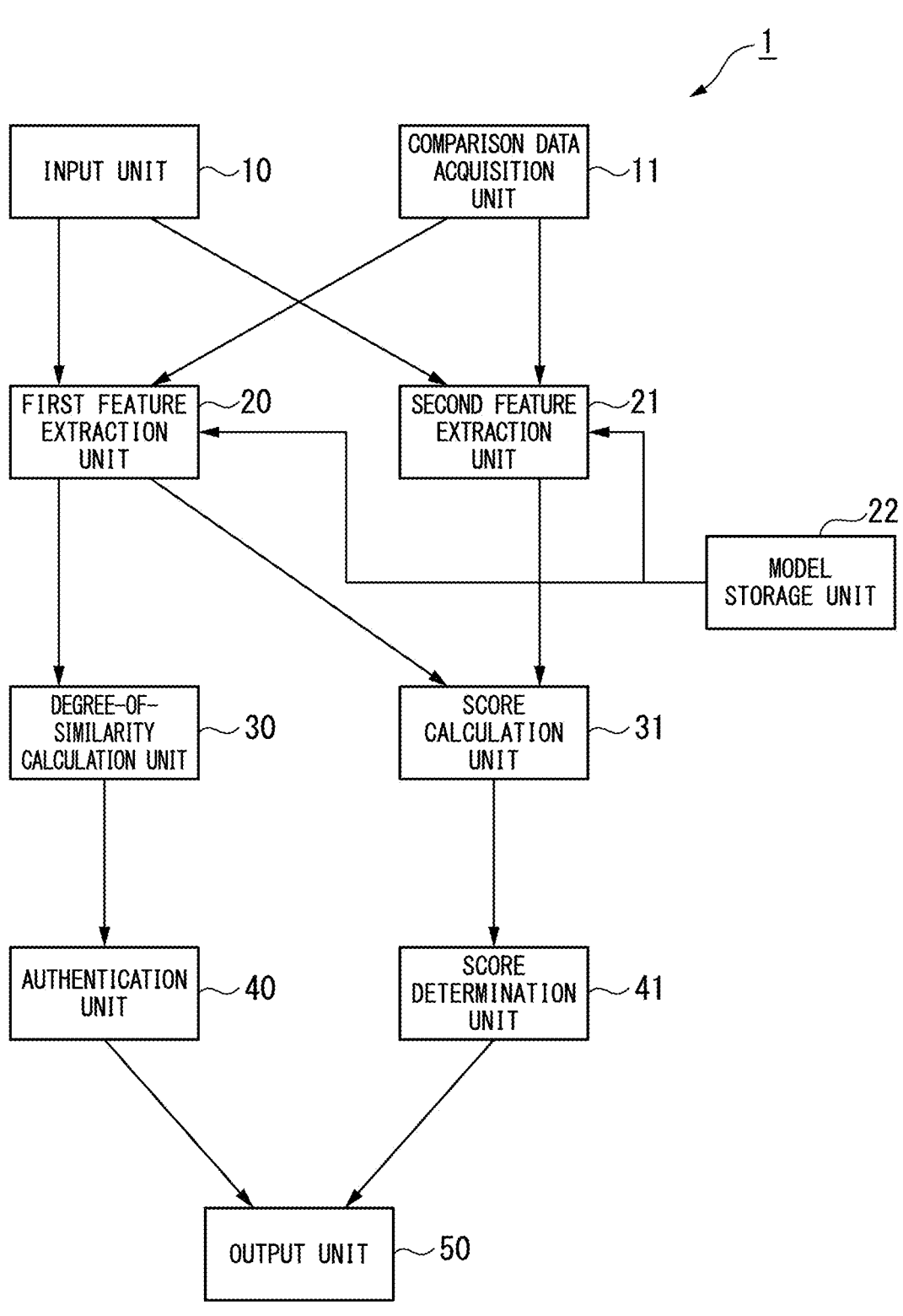
FIG. 2 is a schematic block diagram showing a software configuration of the authentication device according to the first example embodiment.

FIG. 2 is a schematic block diagram showing a software configuration of the authentication device according to the first example embodiment.

The authentication device 1 includes an input unit 10, a comparative data acquisition unit 11, a first feature extraction unit 20, a second feature extraction unit 21, a model storage unit 22, a degree-of-similarity calculation unit 30, a score calculation unit 31, an authentication unit 40, a score determination unit 41, and an output unit 50.

The input unit 10 receives an input of image data for authentication from the user. The image data is, for example, image data in which the user's face is shown. For example, the input unit 10 acquires the image data of the user's face imaged by the camera 101. Hereinafter, data input to the input unit will also be referred to as input data.

The comparative data acquisition unit 11 acquires comparative data to be compared with the input data. For example, the comparative data acquisition unit 11 acquires image data read by the reading device 102 from an IC chip including a photograph in which the user is shown or data of a photograph of the user's face.

By inputting data, the model storage unit 22 stores a trained machine learning model that outputs a feature of the data.

The first feature extraction unit 20 extracts features (first features) with respect to the input data and the comparative data using the trained model stored in the model storage unit 22. Specifically, the first feature extraction unit 20 obtains the feature of the data by inputting data into the trained model stored in the model storage unit 22.

The second feature extraction unit 21 extracts features (second features) with respect to the input data and the comparative data. Specifically, the second feature extraction unit 21 obtains a feature of data by performing a prescribed process for the data and inputting processed data to the trained model stored in the model storage unit 22. Examples of the prescribed process include a process of reducing the effect of perturbation of an adversarial example such as a process of reducing a color depth of each pixel of image data or a spatial smoothing process.

The score calculation unit 31 calculates a score obtained from four features using an input data feature and a comparative data feature calculated by the first feature extraction unit 20 and an input data feature and a comparative data feature calculated by the second feature extraction unit 21. For example, a calculation process can be performed using a calculation formula shown in the following Eq. (1).

[Math. 1]

$$a = \left| \|g_0(x_s) - g_0(x_t)\|_p - \|g_d(x_s) - g_d(x_t)\|_p \right| \tag{1}$$

Here, a denotes the score, $x_s$ denotes the input data, $x_t$ denotes the comparative data, $g_0(x)$ is the feature output when x is input to the first feature extraction unit 20, and $g_d(x)$ is the feature output when x is input to the second feature extraction unit 21. These features are obtained as vectors and addition and subtraction operations can be performed when the dimensions are identical. $\|x\|_p$ is a p-norm value of x.

The score determination unit 41 determines whether or not at least one piece of the input data and the comparative data is an adversarial example on the basis of a score acquired from the score calculation unit 31. As an example of the determination method, there is a determination method of presetting a certain threshold value, determining that an example is an adversarial example if a calculation result exceeds the threshold value, and determining that an example is not an adversarial example if a calculation result is less than or equal to the threshold value.

The degree-of-similarity calculation unit 30 calculates a degree of similarity between the input data feature and the comparative data feature calculated by the first feature extraction unit 20. Examples of the degree of similarity include a degree of cosine similarity and a Euclidean distance.

The authentication unit 40 authenticates whether the person shown in the facial photograph of the input data and the person shown in the facial photograph of the output data are the same person on the basis of the degree of similarity calculated by the degree-of-similarity calculation unit 30.

The output unit 50 externally outputs a determination result of the similarity determination unit 303 and an authentication result of the authentication unit. Examples of the output include an operation of displaying authentication failure, authentication success, and adversarial example detection on the display 103, an operation of printing them using a printer, an operation of transmitting them externally using communication, an operation of recording them in a storage device, and the like.

Trained Model Generation Method

A method of generating a machine learning model stored in the model storage unit 22 will be described.

Figure 3:
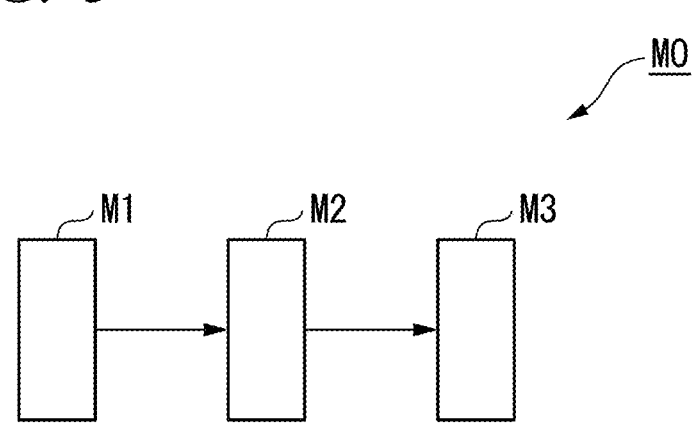
FIG. 3 is a configuration diagram of a machine learning model stored in a model storage unit according to the first example embodiment.

FIG. 3 is a configuration diagram of a classification model M0 used to generate the machine learning model stored in the model storage unit 22 according to the first example embodiment.

As shown in FIG. 3, a machine learning model M0 includes a data input unit M1, a feature calculation unit M2, and a classification unit M3.

The data input unit M1 outputs input image data as a vector to the feature calculation unit M2.

The feature calculation unit M2 converts a vector input from the data input unit M1 into a low-dimensional feature vector and outputs the feature vector to the classification unit M3. The feature vector is an example of a feature. Also, the feature calculation unit M2 is an example of a feature function and a feature calculation model.

The classification unit M3 includes a neural network of two or more layers.

The classification unit M3 performs conversion from a feature vector input from the feature calculation unit M2 into a P-dimensional vector indicating a posterior probability of a person shown in an image represented by the feature vector.

Figure 4:
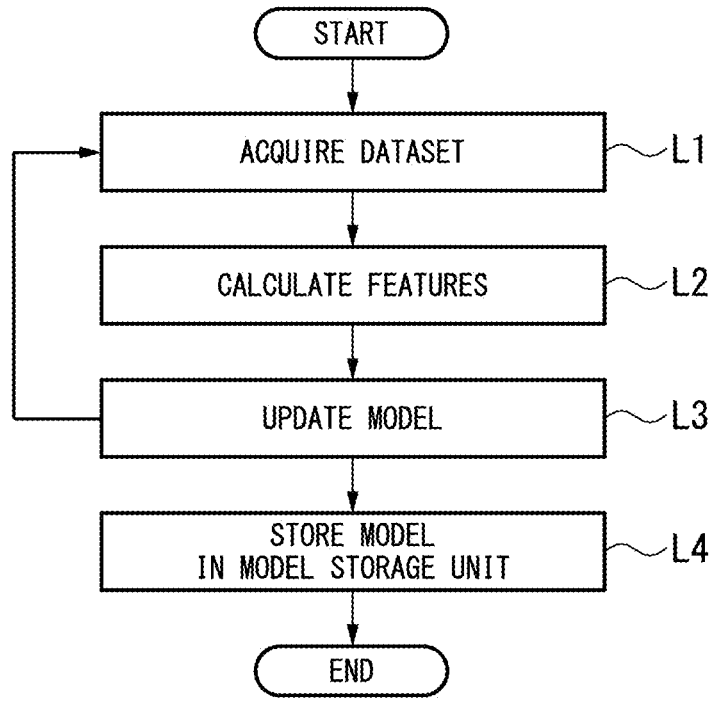
FIG. 4 is a flowchart showing a method of generating a machine learning model stored in a model storage unit according to the first example embodiment.

FIG. 4 is a flowchart showing a method of generating the machine learning model M0 stored in the model storage unit 22 according to the first example embodiment.

The input unit 10 acquires a dataset provided in advance from a database (not shown) and outputs the dataset to the second feature extraction unit (step L1). The dataset is a combination of image data, which is an input example, and a label representing a person, which is an input example. The second feature extraction unit calculates features on the basis of the machine learning model M0 (step L2). Subsequently, parameters of the feature calculation unit M2 and the classification unit M4 are updated on the basis of calculated results (step L3). Subsequently, a partial model including the data input unit M1 and the feature calculation unit M2 is extracted from the machine learning model M0 whose parameters have been updated in step L3 and stored in the model storage unit 22 (step L4). Also, step L1 may be performed again after step L3 to update the parameters of the feature calculation unit M2 and the classification unit M4 a plurality of times.

Figure 5:
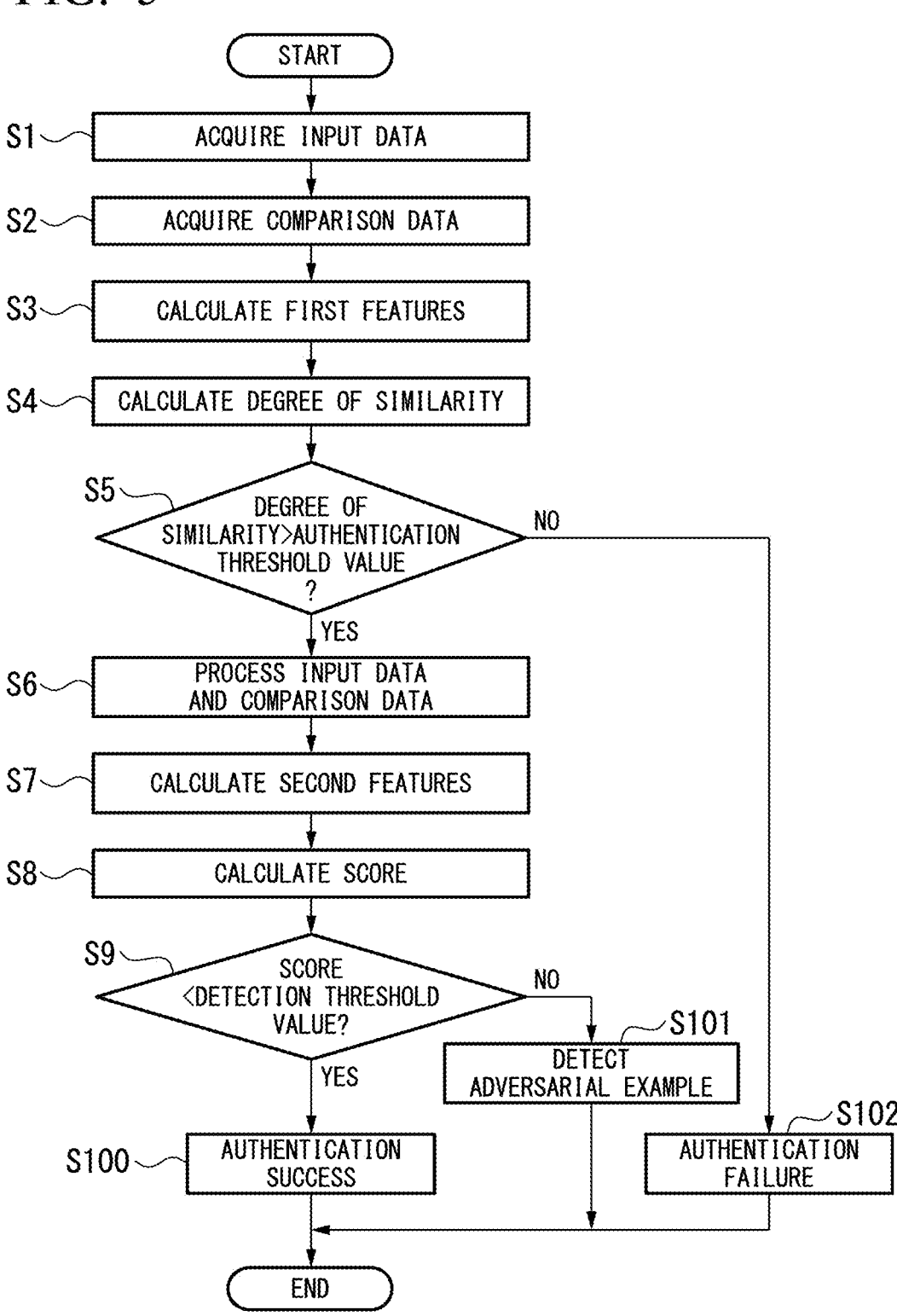
FIG. 5 is a flowchart showing an operation of the authentication device according to the first example embodiment.

FIG. 5 is a flowchart showing an operation of the authentication device according to the first example embodiment.

The first feature extraction unit 20 acquires input data from the input unit 10 (step S1). Furthermore, the first feature extraction unit 20 acquires comparative data from the comparative data acquisition unit 11 (step S2). The first feature extraction unit 20 extracts features of the input data and the comparative data by inputting the acquired input data and comparative data to the trained model stored in the model storage unit 22 (step S3).

Subsequently, the degree-of-similarity calculation unit 30 calculates a degree of similarity on the basis of the features of the input data and the comparative data (step S4). The authentication unit 40 determines whether or not the calculated degree of similarity is less than a set authentication threshold value (step S5). When the calculated degree of similarity is less than the set authentication threshold value (step S5: NO), the authentication unit 40 determines that authentication has failed. The output unit 50 outputs that the authentication has failed (step S102) and the process ends.

On the other hand, when the calculated degree of similarity is greater than or equal to the set authentication threshold value (step S5: YES), the second feature extraction unit 21 applies a prescribed process to the input data and the comparative data (step S6). Subsequently, the second feature extraction unit 21 calculates features of the input data and the comparative data by inputting the processed input data and comparative data to the trained model stored in the model storage unit (step S7). Subsequently, the score calculation unit 31 acquires feature data from the first feature extraction unit 20 and the second feature extraction unit 21 and calculates a score on the basis of the acquired feature data (step S8).

The score determination unit 41 determines whether or not the calculated score is greater than the set detection threshold value (step S9). When the calculated score is greater than the set detection threshold value (step S9: NO), the score determination unit 41 determines that at least one piece of the input data and the comparative data is an adversarial example and the output unit 50 outputs that the adversarial example has been detected (step S101) and the process ends.

When the calculated score is less than or equal to the set detection threshold value (step S9: YES), the score determination unit 41 determines that the input data and the comparative data do not include an adversarial example. Thereby, the authentication unit 40 determines that the authentication is successful. The output unit 50 outputs authentication success (step S100) and the process ends.

Operation and Effects

As described above, according to the first example embodiment, the authentication device performs a process in which the first feature extraction unit calculates first features and the second feature extraction unit calculates second features with respect to the input data and the comparative data and determines whether or not at least one piece of the input data and the comparative data is an adversarial example using the first feature of the input data, the second feature of the input data, the first feature of the comparative data, and the second feature of the comparative data. That is, the authentication device outputs one calculation result on the basis of features obtained for two types of data, i.e., the input data and the comparative data. Thereby, the authentication device according to the first example embodiment can detect an adversarial example using the two types of data.

Also, according to the present invention, because the authentication device outputs one calculation result on the basis of features obtained for the two types of data that are the input data and the comparative data, it is possible to detect an adversarial example more accurately as compared with a technique for detecting an adversarial example on the basis of a type of input data as in Non-Patent Literature 1 and 2.

Second Example Embodiment

In the authentication device according to the first example embodiment, the second feature extraction unit 21 performs a prescribed process for data. On the other hand, in an authentication device according to a second example embodiment, a model M10 acquired by the second feature extraction unit 21 from the model storage unit 22 is a model different from the model M0. The model M10 is a model obtained by examining neurons having a strong correlation with a part (an eye, a nose, or the like) of a face in facial photograph data from the neural network constituting the model M0 and emphasizing values of the neurons. The authentication method according to the second example embodiment is similar to that according to the first example embodiment, except that the operation of the second feature extraction unit 21 is different.

The model M10 will be described.

Figure 6:
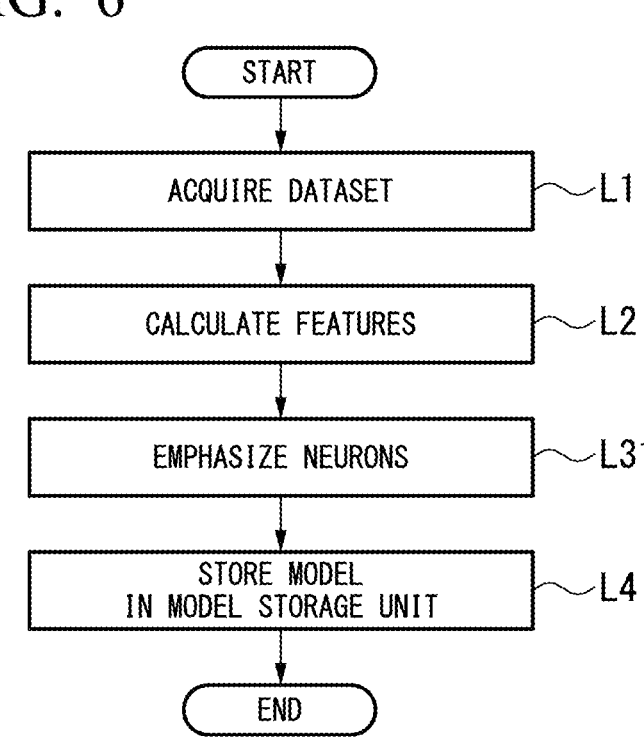
FIG. 6 is a flowchart showing a model training method according to a second example embodiment.

FIG. 6 is a flowchart showing a method of training the model M10 according to the second example embodiment.

The input unit 10 acquires a dataset provided in advance from a database (not shown) and outputs the dataset to the second feature extraction unit (step L1). The dataset is a combination of image data, which is an input example, and a label indicating a person, which is an input example. The second feature extraction unit calculates features on the basis of the machine learning model M0 (step L2). Subsequently, neurons having a strong correlation with a part (an eye, a nose, or the like) of a face of the facial photograph data are examined from the neural network constituting the model M0 and values of the neurons are emphasized (step L31). Subsequently, a partial model including the data input unit M1 and the feature calculation unit M2 is extracted from the machine learning model M0 changed in step L31 and stored in the model storage unit 22 (step L4).

Operation and Effects

In this way, according to the second example embodiment, as in the first example embodiment, because the authentication device outputs one calculation result on the basis of features obtained with respect to the two types of data that are the input data and the comparative data, it is possible to detect an adversarial example more accurately as compared with a device that outputs one calculation result from a type of input data as in Non-Patent Literature 1 and 2.

Third Example Embodiment

FIG. 7 is a schematic block diagram showing a configuration of an authentication device according to a third example embodiment.

Figure 8:
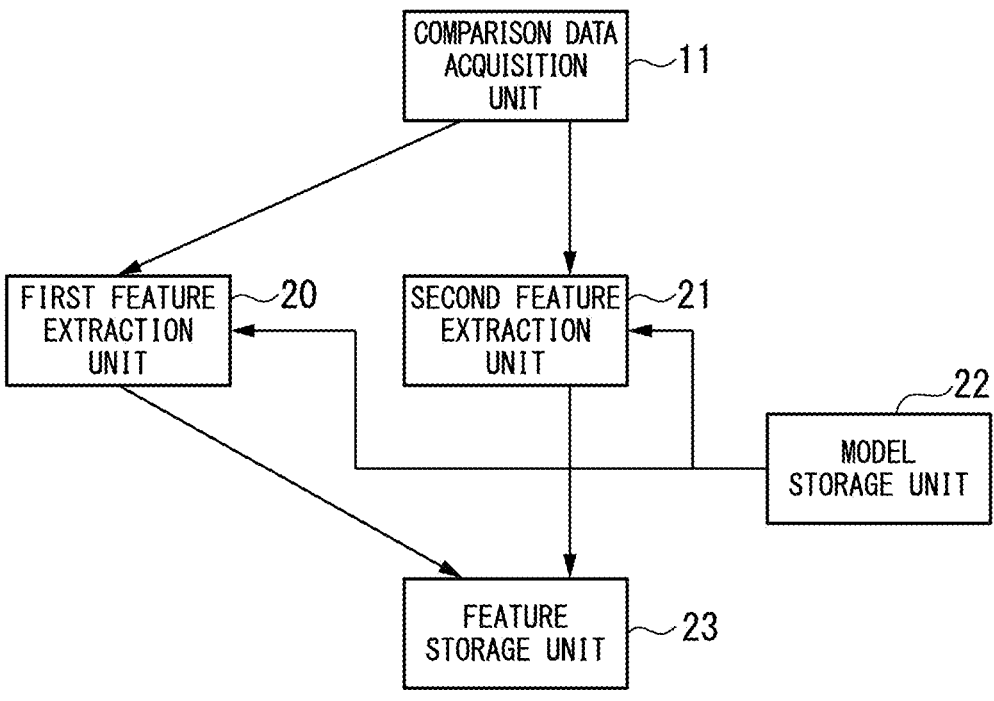
FIG. 8 is a schematic block diagram showing a partial configuration of the authentication device according to the third example embodiment.

FIG. 8 is a schematic block diagram showing a partial configuration of the authentication device according to the third example embodiment.

The authentication device according to the first example embodiment is a device that performs authentication using one piece of input data and one piece of comparative data. On the other hand, the authentication device according to the third example embodiment is a device that performs authentication according to one piece of input data and N pieces of comparative data provided in advance or N pieces of input data and N pieces of comparative data provided in advance.

The adversarial example detection device according to the third example embodiment further includes a feature storage unit 23 in addition to the features of the first example embodiment.

A first feature extraction unit 20 and a second feature extraction unit 21 acquire comparative data from a comparative data acquisition unit 11 and calculate a feature of the acquired comparative data. Also, the first feature extraction unit 20 and the second feature extraction unit 21 output the calculated feature to the feature storage unit 23. Here, the first feature extraction unit 20 and the second feature extraction unit 21 are examples of a recording means.

The feature storage unit 23 stores feature data related to the comparative data. Also, the feature storage unit 23 outputs the stored feature data to a degree-of-similarity calculation unit 30 or a score calculation unit 31.

The degree-of-similarity calculation unit 30 and the score calculation unit 31 perform calculations using the first feature of the input data, the second feature of the input data, and the feature of the comparative data acquired from the feature storage unit 23.

Figure 9:
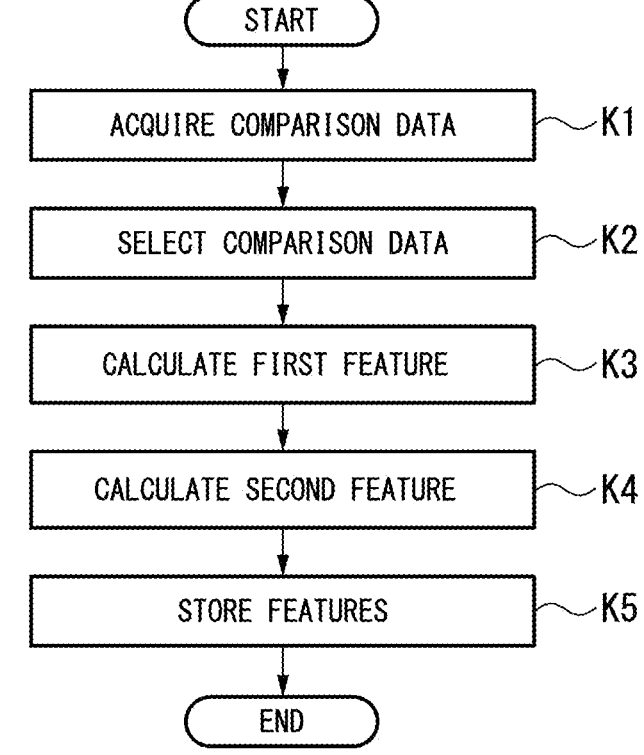
FIG. 9 is a flowchart showing a flow from a comparative data input process to a comparative data storage process in the authentication device according to the third example embodiment.

FIG. 9 is a flowchart showing a flow from a comparative data input process to a comparative data storage process in the authentication device according to the third example embodiment.

The comparative data acquisition unit 11 acquires N pieces of comparative data (step K1). For example, the comparative data according to the third example embodiment is stored in advance in a database or the like. Thereafter, the authentication device selects the acquired N pieces of comparative data one by one (step K2) and executes the following processing of steps K3 to K5 with respect to the comparative data.

The first feature extraction unit 20 calculates a first feature of the comparative data selected in step K2 (step K3). Also, the second feature extraction unit 21 calculates a second feature of the comparative data selected in step K2 (step K4). The feature storage unit 23 stores the first feature calculated in step S3 and the second feature calculated in step S4 in association (step K5).

Thereby, the feature storage unit 23 stores the first feature and the second feature of each of the N pieces of comparative data.

Figure 10:
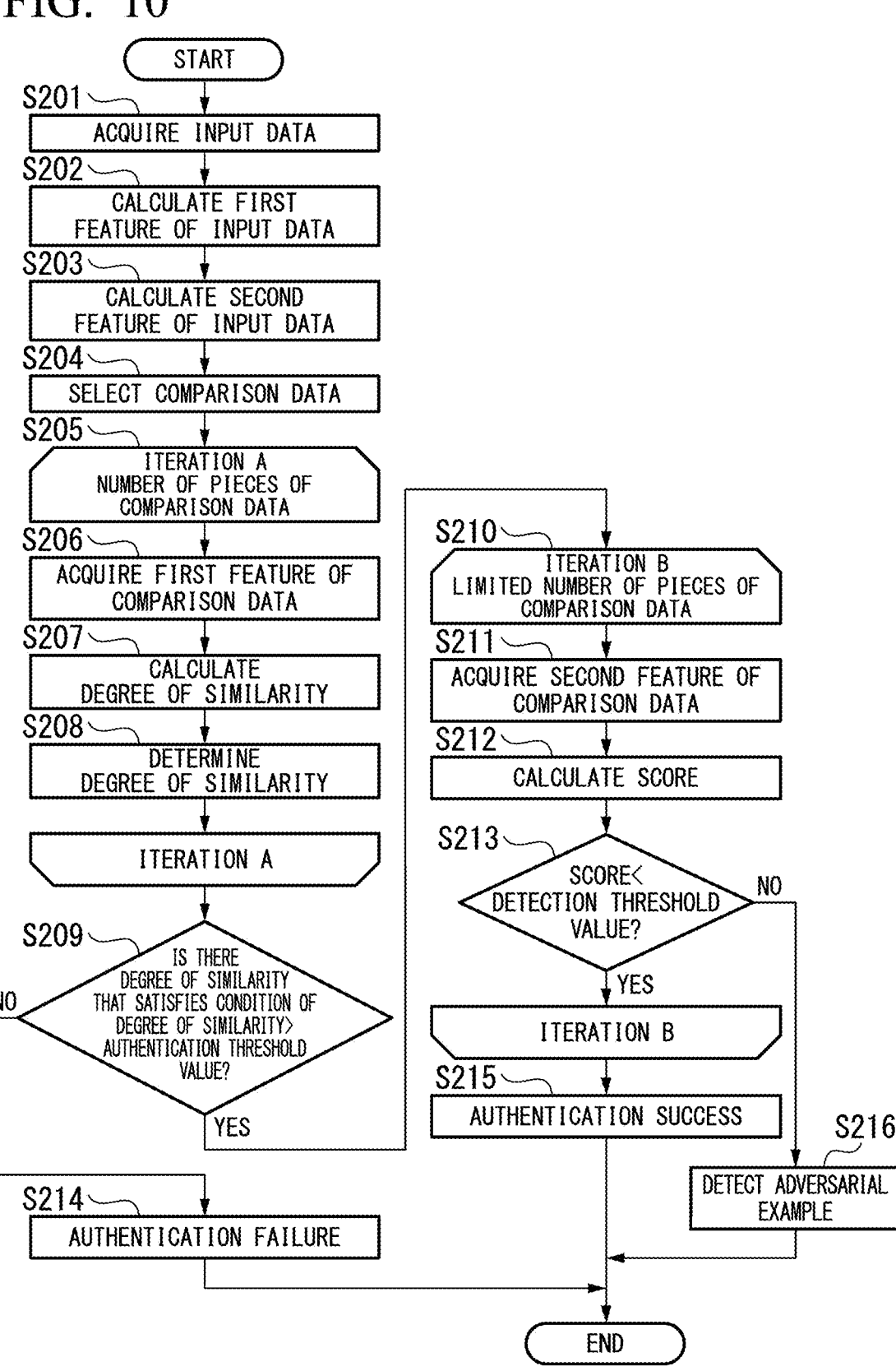
FIG. 10 is a flowchart showing a flow from an input data input process to an input data authentication process in the authentication device according to the third example embodiment.

FIG. 10 is a flowchart showing a flow from an input data input process to an input data authentication process in the authentication device according to the third example embodiment.

The input unit acquires input data (step S201). The first feature extraction unit 20 calculates a first feature of the input data (step 202). Also, the second feature extraction unit 21 calculates a second feature of the input data (step S203).

Subsequently, the authentication device selects N pieces of comparative data one by one (step S204) and executes the following processing of steps S206 to S209 with respect to the comparative data (step S205).

The degree-of-similarity calculation unit 30 acquires a first feature of the comparative data selected in step S204 from the feature storage unit 23 (step S206).

The degree-of-similarity calculation unit 30 calculates a degree of similarity of the input data to the comparative data on the basis of the first feature of the input data calculated in step S202 and the first feature of the comparative data acquired in step S205 (step S207). The authentication unit 40 determines whether or not the calculated degree of similarity is less than a set authentication threshold value (step S208).

When all calculated degrees of similarity are less than the set authentication threshold value (step S209: NO), the authentication unit 40 determines that authentication has failed. The output unit 50 outputs that the authentication has failed (step S214) and the process ends.

When at least one calculated degree of similarity is greater than or equal to the set authentication threshold value (step S209: YES), the following processing of steps S211 to S213 is executed with respect to the limited comparative data (step S210). The limited comparative data mentioned here is the comparative data corresponding to the degree of similarity determined to be greater than or equal to the authentication threshold value in step 208.

The score calculation unit 31 acquires a second feature of the comparative data from the feature storage unit 23 (step S211). The score calculation unit 31 calculates a score based on the first feature of the input data calculated in step S202, the second feature of the input data calculated in step S203, the first feature of the comparative data acquired in step S206, and the second feature of the comparative data acquired in step S211 (step S212).

The score determination unit 41 determines whether or not the calculated score is greater than the set detection threshold value (step S213). When the calculated score is greater than the detection threshold value (step S213: NO), the score determination unit 41 determines that an adversarial example has been detected and the output unit 50 outputs that an adversarial example has been detected (step S216) and the process ends.

When all the calculated scores are less than or equal to the set detection threshold value, the output unit 50 outputs authentication success (step S215) and the process ends.

Operation and Effects

In this way, according to the third example embodiment, feature data of a plurality of pieces of comparative data is stored in advance and an adversarial example is detected by comparing the comparative data with one piece of input data. Thereby, it is possible to omit the calculation of the comparative data and reduce an amount of calculation.

Other Example Embodiments

Although the example embodiments of the present invention have been described in detail above with reference to the drawings, the specific configuration is not limited to the above configuration and various design changes and the like can be made without departing from the scope and spirit of the present invention.

Although the authentication device 1 uses facial photograph data as input data in the above-described example embodiment, the present invention is not limited thereto. For example, speech data obtained by recording a user's speech or the like may be used as input data according to another example embodiment.

Also, a target to be authenticated by the authentication unit 40 is not limited to a person shown in the facial photograph. For example, an animal, a road sign, or the like may be authenticated as the target.

Although the first feature extraction unit 20 and the second feature extraction unit 21 detect an adversarial example using the feature that is the final output of the machine learning model in the above-described example embodiment, the present invention is not limited thereto. For example, the first feature extraction unit 20 and the second feature extraction unit 21 according to other example embodiments may use a value shown in the process of calculating the machine learning model (for example, a feature obtained in a process of calculating the intermediate layer of the neural network) to detect an adversarial example. Specifically, the score calculation unit 31 calculates a score on the basis of the feature extracted by a certain intermediate layer and the score determination unit 41 determines whether or not an example is an adversarial example on the basis of the score.

The second feature extraction unit 21 according to the first example embodiment extracts a feature from processed data obtained by processing the input data and the comparative data using the machine learning model used by the first feature extraction unit 20. Also, the second feature extraction unit 21 according to the second example embodiment extracts a feature using a model composed of a neural network obtained by emphasizing a value of a specific neuron among machine learning models used by the first feature extraction unit 20. In this way, although an example in which the second feature extraction unit 21 calculates a feature different from that of the first feature extraction unit has been described in the first example embodiment and the second example embodiment, a feature calculation method of the second feature extraction unit 21 is not limited thereto. That is, it is only necessary for the second feature extraction unit 21 to extract second features of the input data and the comparative data in a calculation method different from that of the first feature extraction unit 20.

Although the authentication device according to the above-described third example embodiment calculates a feature of the comparative data, inputs the input data after storing the feature in the feature storage unit 23, and performs degree-of-similarity calculation and score calculation, the present invention is not limited thereto. For example, the input data and the comparative data are acquired at the same time and the feature calculated from the input data or the comparative data is stored in the feature storage unit 23. Storage in the storage unit and personal authentication or detection of an adversarial example may be performed in parallel such that degree-of-similarity calculation and score calculation are performed using features.

Basic Configuration

Figure 11:
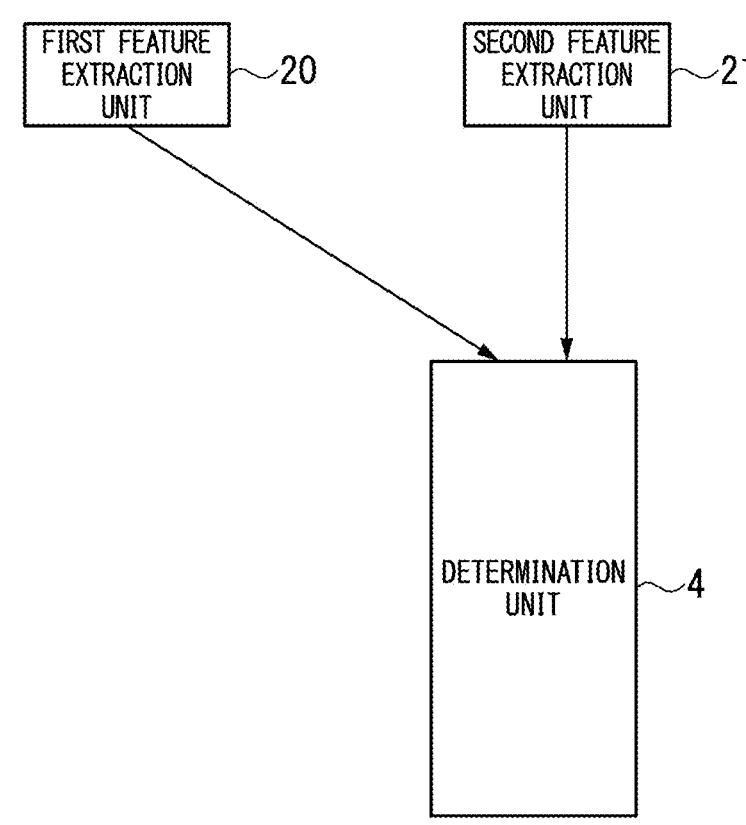
FIG. 11 is a schematic block diagram showing a basic configuration of an adversarial example detection device.

FIG. 11 is a schematic block diagram showing a basic configuration of an adversarial example detection device.

Although the configuration shown in FIG. 1 and the like has been described as one example embodiment of the adversarial example detection device in the above-described example embodiment, the basic configuration of the adversarial example detection device is as shown in FIG. 11.

That is, the adversarial example detection device has the basic configuration of the first feature extraction unit 20, the second feature extraction unit 21, and the determination unit 4.

The first feature extraction unit 20 extracts first features with respect to input data and comparative data in a first calculation method.

The second feature extraction unit 21 extracts second features with respect to the input data and the comparative data in a second calculation method different from the first calculation method.

The determination unit 4 determines whether or not at least one piece of the input data and the comparative data is an adversarial example through calculation using the first features and the second features.

Thereby, the adversarial example detection device can detect an adversarial example in an authenticator that compares features of two or more pieces of data.

Figure 12:
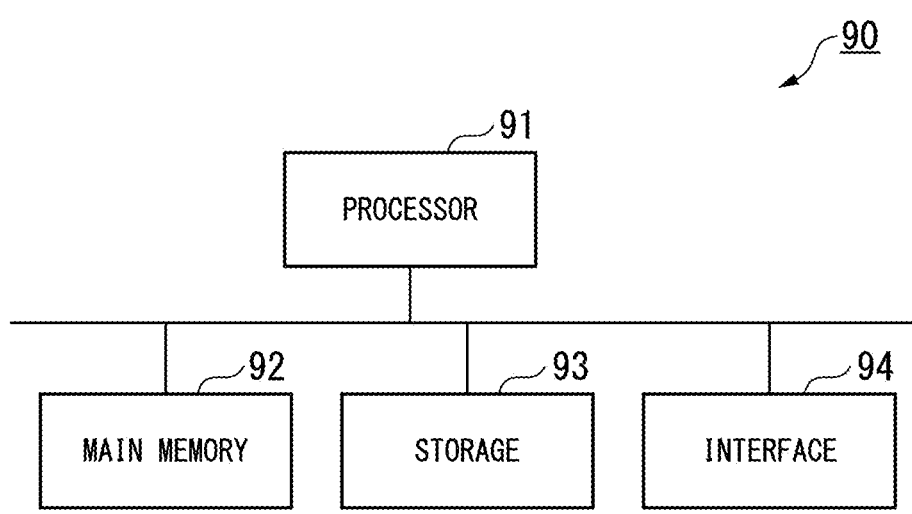
FIG. 12 is a schematic block diagram showing a configuration of a computer according to at least one example embodiment.

FIG. 12 is a schematic block diagram showing a configuration of a computer according to at least one example embodiment.

A computer 90 includes a processor 91, a main memory 92, a storage 93, and an interface 94.

The above-described adversarial example detection device is mounted in the computer 90. The operation of each of the above-described processing units is stored in the storage 93 in the form of a program. The processor 91 reads a program from the storage 93, loads the program into the main memory 92, and executes the above process in accordance with the program. Also, the processor 91 secures a storage area corresponding to each of the above-described storage units in the main memory 92 in accordance with the program.

The program may be a program for implementing some of the functions exerted on the computer 90. For example, the program may exert its function in combination with another program already stored in the storage 93 or in combination with another program mounted in another device. In another example embodiment, the computer 90 may include a custom large-scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions implemented by the processor 91 may be implemented by the integrated circuit.

Examples of the storage 93 include a hard disk drive (HDD), a solid-state drive (SSD), a magnetic disk, a magneto-optical disk, a compact disc read only memory (CD-ROM), a digital versatile disc read only memory (DVD-ROM), a semiconductor memory, and the like. The storage 93 may be internal media directly connected to a bus of the computer 90 or external media connected to the computer 90 via the interface 94 or a communication circuit. Also, when the above program is distributed to the computer 90 via a communication circuit, the computer 90 receiving the distributed program may load the program into the main memory 92 and execute the above process. In at least one example embodiment, the storage 93 is a non-transitory tangible storage medium.

Also, the program may be a program for implementing some of the above-mentioned functions. Furthermore, the program may be a so-called differential file (differential program) for implementing the above-described function in combination with another program already stored in the storage 93.

DESCRIPTION OF REFERENCE SYMBOLS

1 Authentication device
101 Camera
102 Reading device
103 Display
10 Input unit
11 Comparative data acquisition unit
20 First feature extraction unit
21 Second feature extraction unit
22 Model storage unit
23 Feature storage unit 30 Degree-of-similarity calculation unit
31 Score calculation unit
4 Determination unit
40 Authentication unit
41 Score determination unit
50 Output unit

What is claimed is:

1. An adversarial example detection apparatus comprising:
   at least one memory configured to store instructions; and
   at least one processor configured to execute the instructions to:
      extract first features with respect to input data and comparison data in a first calculation method;
      extract second features with respect to the input data and the comparison data in a second calculation method different from the first calculation method; and
      determine whether or not at least one piece of the input data and the comparison data is an adversarial example through calculation using the first features and the second features, wherein the determine includes calculating a degree of similarity (DoS) score between features of the input data and the comparison data,
   wherein:
      when an authentication based on the first features succeeds by calculating the DoS score as less than a detection threshold, the second features are extracted as extract features of processed data of the input data and the comparison data,
      the first calculation method and the second calculation method are calculation methods based on a calculation model created in machine learning;
      the first calculation method comprises calculating the first features by inputting the input data and the comparison data into a first model, the first model being a trained neural network model, and
      the second calculation method comprises:
         calculating the second features by inputting the processed data as a vector into a second model and converting the vector input into a low-dimensional feature vector for classification, the second model being a neural network model in which a value of a specific neuron among a plurality of neurons constituting the first model is changed, wherein neurons of the plurality of neurons having a strong correlation are examined from the neural network model, and values of the neurons are emphasized among machine learning models;
         generating process data by reducing a color depth of each pixel of the input data and the comparison data or by spatially smoothing the input data and the comparison data; and
         calculating features of the process data by the first calculation method.

2. The adversarial example detection apparatus according to claim 1, wherein the second calculation method further comprises generating processed data obtained by processing the input data and the comparison data and calculating a feature of the processed data in the first calculation method.

3. The adversarial example detection apparatus according to claim 1, wherein the second calculation method further comprises calculating a feature in the first calculation method while emphasizing a part of data of a calculation target of the second features.

4. The adversarial example detection apparatus according to claim 3, the second model is a model comprising a neural network among the first model that emphasizes neuron values that are strongly correlated with a part of a face in facial photograph data.

5. The adversarial example detection apparatus according to claim 1, wherein the at least one processor is further configured to execute the instructions to:

allow a storage to store the first features of the comparison data and the second features of the comparison data; and acquire the first features and the second features from the storage.

6. The adversarial example detection apparatus according to claim 1, the at least one processor is further configured to execute the instructions to:

authenticate whether or not the input data and the comparison data are data derived from an identical person or an identical object based on the first features of the input data and the first features of the comparison data.

7. An adversarial example detection method comprising:

extracting first features with respect to input data and comparison data in a first calculation method;

extracting second features with respect to the input data and the comparison data in a second calculation method different from the first calculation method; and determining whether or not at least one piece of the input data and the comparison data is an adversarial example through calculation using the first features and the second features, wherein the determining includes calculating a degree of similarity (DoS) score between features of the input data and the comparison data, wherein:

when an authentication based on the first features succeeds by calculating the DoS score as less than a detection threshold, the second features are extracted as extract features of processed data of the input data and the comparison data, the first calculation method and the second calculation method are calculation methods based on a calculation model created in machine learning, the first calculation method comprises calculating the first features by inputting the input data and the comparison data into a first model, the first model being a trained neural network model, the second calculation method comprises:

calculating the second features by inputting the input data and the comparison data as a vector into a second model and converting the vector input into a low-dimensional feature vector for classification, the second model being a neural network model in which a value of a specific neuron among a plurality of neurons constituting the first model is changed, wherein neurons of the plurality of neurons having a strong correlation are examined from the neural network model, and values of the neurons are emphasized among machine learning models;

generating process data by reducing a color depth of each pixel of the input data and the comparison data or by spatially smoothing the input data and the comparison data; and calculating features of the process data by the first calculation method.

8. A non-transitory computer-readable recording medium storing a program configured to cause a computer to:

extract first features with respect to input data and comparison data in a first calculation method;

extract second features with respect to the input data and the comparison data in a second calculation method different from the first calculation method; and determine whether or not at least one piece of the input data and the comparison data is an adversarial example through calculation using the first features and the second features, wherein the determine includes calculating a degree of similarity (DoS) score between features of the input data and the comparison data, wherein:

when an authentication based on the first features succeeds by calculating the DoS score as less than a detection threshold, the second features are extracted as extract features of processed data of the input data and the comparison data, wherein the first calculation method and the second calculation method are calculation methods based on a calculation model created in machine learning, the first calculation method comprises calculating the first features by inputting the input data and the comparison data into a first model, the first model being a trained neural network model, the second calculation method comprises:

calculating the second features by inputting the input data and the comparison data as a vector into a second model and converting the vector input into a low-dimensional feature vector for classification, the second model being a neural network model in which a value of a specific neuron among a plurality of neurons constituting the first model is changed, wherein neurons of the plurality of neurons having a strong correlation are examined from the neural network model, and values of the neurons are emphasized among machine learning models;

generating process data by reducing a color depth of each pixel of the input data and the comparison data or by spatially smoothing the input data and the comparison data; and calculating features of the process data by the first calculation method.

* * * * *